United States Patent Office 3,780,133
Patented Dec. 18, 1973

3,780,133
DIPHENOL CONTAINING POLYESTERS DERIVED FROM TRIS (2 - HYDROXYALKYL)ISOCYANURATES
John M. Kolyer, Convent, and Albert A. Kveglis, Pine Brook, N.J., assignors to Allied Chemical Corporation, New York, N.Y.
No Drawing. Original application Oct. 30, 1968, Ser. No. 771,999, now Patent No. 3,632,837. Divided and this application May 24, 1971, Ser. No. 146,477
Int. Cl. C08g 17/06, 17/14, 20/32
U.S. Cl. 260—857 R                  11 Claims

ABSTRACT OF THE DISCLOSURE

Incorporation of a diphenol in a polyester reaction product of a tris(2-hydroxyalkyl)isocyanurate and a polycarboxylic acid avoids gel formation and provides a thermo-oxidatively stable polyester with excellent adhesion properties.

BACKGROUND OF THE INVENTION

This invention relates to novel heat-stable polyesters useful as electrical insulating material; in particular, it relates to polyester reaction products of tris(2-hydroxyalkyl)-isocyanurates, a polycarboxylic acid and a diphenol.

This application is a divisional of U.S. application Ser. No. 771,999, filed Oct. 30, 1968, now U.S. Pat. 3,632,837.

Tris(2 - hydroxyethyl)isocyanurate and polyesters derived therefrom are known in the literature; for example, Little U.S. Patent 3,088,948 discloses tris(2-hydroxyethyl)-isocyanurate and its homologues, and Formaini application Ser. No. 443,655 filed Mar. 21, 1965, now U.S. Pat. 3,477,996, discloses polyesters derived therefrom using various dicarboxylic acids. The most commonly used acids in the preparation of isocyanurate polyesters are terephthalic and orthophthalic acids. The condensation of a polycarboxylic acid and a triol such as tris(2-hydroxyalkyl)isocyanurates to produce these polyesters tends to lead to gelation. In order to overcome this problem, various aliphatic glycols have been added to the reaction mixture in order to provide a more linear polymer and thereby avoid gel formation. However, polymer products containing alkylene groups from the aliphatic glycol suffer the disadvantage of limited thermo-oxidative stability.

SUMMARY OF THE INVENTION

It has now been found that polyesters comprising the reaction product of a tris(2-hydroxyalkyl)isocyanurate of the formula

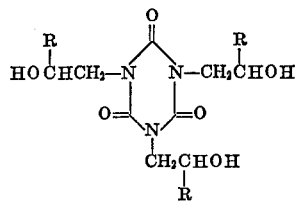

wherein R is hydrogen, methyl or ethyl, a polycarboxylic acid and a diphenol possess excellent thermo-oxidative stability and excellent adhesion characteristics. These polyesters are useful as electrical insulators in the preparation of wire enamels and varnishes.

DETAILED DESCRIPTION OF THE INVENTION

Incorporation of a diphenol in tris(2-hydroxyalkyl)-isocyanurate polyesters according to the instant invention eliminates the problem of gel formation without adversely affecting the stability of the product. Among the diphenols which are suitable for use in preparing heat-stable polyesters according to the instant invention are the following: pyrocatechol; resorcinol; hydroquinone; 1,4-dihydroxynaphthalene and isomers thereof; bisphenol A; p,p'-dihydroxybiphenyl; 4,4' - dihydroxydiphenylmethane and isomers thereof; 1,4-dihydroxyanthracene and isomers thereof; 1,4-dihydroxyphenanthrene and isomers thereof; 1,4-dihydroxypyrene and isomers thereof; 4,4'-dihydroxydiphenyl ether and isomers thereof; 4,4'-dihydroxydiphenyl sulfide and isomers thereof; 4,4'-dihydroxydiphenyl sulfone and isomers thereof; 4,4'-dihydroxybenzophenone and isomers thereof; 3,3,3',3'-tetramethyl-6,6-bis(2-hydroxy) - 6,6' - spirobiindane; mono-, di-, tri-, and tetraphenyl substituted hydroquinone; mono-, di-, tri-, and tetraphenyl substituted bisphenol A; etc. Preferred diphenols are resorcinol, hydroquinone and bisphenol A.

The amount of diphenol to be incorporated in the polyester varies with the degree of functionality desired in the final product, the level of heat stability desired, and other related properties. In general, the diphenol will be incorporated in amounts of up to about 30% by weight, based on total charge weight, although greater levels may be desirable under certain circumstances. Preferably, between about 10% and 20% of diphenol will be employed.

For use in wire enamels and varnishes, it is preferred that the instant polyesters be derived from tris(2-hydroxyethyl)isocyanurate. This material, and the other tris(2-hydroxyalkyl)isocyanurates, can be prepared by the reaction of an alkylene oxide with cyanuric acid according to the procedure of aforesaid U.S. Pat. 3,088,948.

Polycarboxylic acids which are suitable for the instant polyesters include the benzene dicarboxylic acids, such as phthalic, isophthalic and terephthalic acids; trimellitic; succinic; adipic; sebacic; azelaic; maleic; fumaric; tetrahydrophthalic; itaconic acids; endo-bis-5-norbornene-2,3-dicarboxylic acid; isomers of methylbicyclo(2.2.1)-heptene-2,3-dicarboxylic acid; glutaric acid; pimelic acid; malonic acid; the Diels-Alder adduct of maleic and hexachlorocyclopentadiene; chlorendic anhydride; and 2,5-endomethylene tetrahydrophthalic anhydride; and phenylindane dicarboxylic acid.

Terephthalic and isophthalic acids are the preferred polycarboxylic acids for this purpose. They may be used alone or in admixture with each other as the sole polycarboxylic acid component, or they may be replaced in part by another acid. In general, it is preferred that terephthalic and/or isophthalic acid constitute at least about 20 equivalent percent of the total acid constituent. The modifying polycarboxylic acid might be selected from any of the aforementioned acids or other similar compounds.

The acid ingredient to be used in the preparation of the polyesters may be in the form of the free polycarboxylic acid, acyl halides thereof, e.g., the diacid chloride, and lower dialkyl esters. Mixed functional polybasic acid as well as the anhydrides of the polycarboxylic acid might also be employed if desired. Normally, the dimethyl ester is preferred.

While the tris(2-hydroxyalkyl)isocyanurate can be employed as the sole polyhydric alcohol in the instant polyesters, it can also be replaced in part by one or more other polyhydric alcohols. As little as about 5% by weight of the total polyhydric alcohol can be the isocyanurate, but preferably at least about 20% by weight will be. (On an equivalent basis, at least about 5% of total polyhydric alcohol content will be the isocyanurate, preferably at least about 10%.)

Modifying polyhydric alcohols which might be employed in this fashion include ethylene glycol; glycerine; pentaerythritol; 1,1,1-trimethylolethane; 1,1,1-trimethylolpropane; sorbitol; mannitol; dipentaerythritol; α,ω-aliphatic hydrocarbon diols having 4 to 5 carbon atoms, e.g., butanediol-1,4; pentanediol-1,5; butene-2-diol-1,4; and butyne-2-diol-1,4; and cyclic glycols, e.g., 2,2,4,4-tetramethyl-1,3-cyclobutanediol, hydroquinone di beta hydroxyethyl ether and 1,4-cyclohexanedimethanol. However, to the extent that improved heat stability is desired in the final product, the above-mentioned alkylene glycols will be replaced, at least in part, by a diphenol.

In making the polyesters at least about 95 equivalent percent of hydroxyl material should be employtd with respect to the amount of polycarboxylic acid used, and preferably between about 100 and 160 equivalent percent of hydroxy material will be used. The amount of hydroxyl material employed is specified herein in terms of equivalents since the alcohol and acid react on an equivalent basis rather than on a molar basis.

The instant polyesters can be conveniently prepared by charging the isocyanurate, acid ingredients, diphenol, and any other modifying agents desired directly into a reaction vessel.

While a solvent may be used, normally the polyesterification reaction will be conducted with a minimum amount or without any solvent for reasons of economy as well as ease of recovery. In the event that a solvent is employed, the solvent should be an inert one which forms an azeotrope with water at a sufficiently high temperature, for example, toluene, xylene, etc.

After addtiion of the ingredients, heating of the reaction mixture is continued at an elevated temperature between about 150° C. and 250° C. and preferably at about 200-235° C., until the desired product is obtained. One measure of when the reaction should be terminated is the acid number (AN) of the polyester, defined as the number of milligrams of potassium hydroxide required to neutralize one gram of sample, which can be determined by procedures well known to those with skill in the art. Usually, preferred products will have an acid number less than about 60, although higher acid numbers may be desirable depending upon molecular weight and end use criteria. Another measure of when the reaction should be terminated is the hydroxyl number (HN), defined analogously to the acid number.

In addition to aforesaid method of simultaneously charging all ingredients into the reaction vessel, the polyester might also be prepared by first condensing the diphenol with the polycarboxylic acid and then reacting this intermediate ester condensate with the isocyanurate.

Upon termination of the polymerization reaction, any solvent employed can be stripped off under vacuum, and the resulting mass cooled to afford the final polyester product. To obtain wire enamels, however, the reaction mixture might be dissolved in cresylic acid or other appropriate solvents, and modified in a manner appropriate to obtaining superior compositions.

The polyesters of the instant invention may be advantageously employed for a variety of purposes. For example, they might be used in industrial coatings, laminates, films, electric insulators especially as wire enamels or varnishes, as well as in making molded articles. In solution, they can be used to impregnate cloth, paper, asbestos and the like. They can also be employed in general wherever alkyd resins are useful.

The solvent employed in making a wire enamel is preferably cresylic acid. Cresylic acid has a boiling range of 185° C. to 230° C. and is a mixture of o-, m- and p-cresols. The individual cresols, e.g., para-cresol, meta-cresol or ortho-cresol can be employed, although it is preferred to use the commercial cresylic acid mixture. Other solvents which might be used individually or an admixture with cresylic acid are phenol, xylene, toluene, naphtha and the like.

The flexibility of coatings prepared from the instant polyesters may be further improved by preparing a high functionality polyester and, separately, a low or intermediate functionality polyester and then blending the two together to form a solution of both which is used to coat the electrical conductors. By employing such blends the excellent properties of heat shock and thermal stability or thermal life are obtained in combination with a surprising and significant improvement in flexibility. In the high functionality or extensively cross-linked resins, small amounts of dihydroxy compounds may be included, but the amount must be limited so that the functionality of cross-linking is not significantly diminished. The amount of dihydroxy compound can be as high as about 10% of the amount of isocyanurate used. Satisfactory dihydroxy compounds include such compounds as ethylene glycol; 1,4-butanediol; neopentyl glycol; 1,5-pentanediol; 1,6-cyclohexanedimethanol; 2,2,4,4-tetramethyl - 1,3 - cyclobutanediol; propylene glycol; and 4,4'-bis(hydroxymethyl)diphenyl ether. However, to the extent that increased heat stability is desired in the final product, the alkylene glycols will be replaced, at least in part, by a diphenol. In the lower functionality resin, the amount of dihydroxy material will be approximately equivalent to the amount of isocyanurate.

When used in wire enamel compositions, the instant polyesters may have added thereto small amounts of metal driers to improve the physical properties of the enamel. The metal drier is preferably used in an amount of 0.1 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate, and cadmium octoate. Other suitable metal driers, specifically polyvalent metal driers such as manganese naphthenate and cobalt naphthenate can be employed.

Also, the properties of the polyester can be improved for wire enamel and similar purposes by the addition of a polyisocyanate in an amount up to about 40%, preferably 0.1–15% by weight of the total of polyisocyanate and polyester. Preferably the polyisocyanate will have at least three available isocyanate groups although diisocyanates may be used.

Among the polyisocyanates which can be employed there may be mentioned diisocyanates such as 2,4-tolylene diisocyanate; 2,6-tolylene diisocyanate; cyclopentylene diisocyanate; m-phenylene diisocyanate; p-phenylene diisocyanate; ethylene diisocyanate; butylidene diisocyanate; 1,5-naphthalene diisocyanate; 1,6-hexamethylene diisocyanate; dianisidine diisocyanate; 4,4'-diphenyl ether diisocyanate; 4,4',4''-triphenyl methane triisocyanate (Desmodur R); the cyclic trimer of 2,4-tolylene diisocyanate; the cyclic trimer of 2,6-tolylene diisocyanate; mixtures of the cyclic trimers of 2,4-tolylene diisocyanate and 2,6-tolylene diisocyanate; the trimer of 4,4'-diphenyl methane diisocyanate; trifunctional isocyanate trimers having the formula:

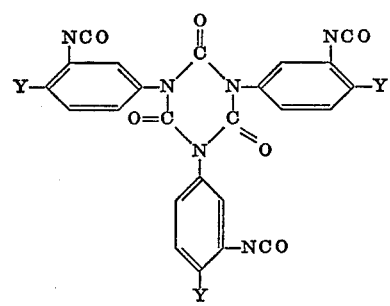

where Y is a lower alkyl radical, e.g., n-butyl, tertiary butyl, secondary butyl, isopropyl, methyl, ethyl, etc.: 1,3,5-triisocyanate benzene, 2,4,6-triisocyanate toluene; 4,4' - dimethyldiphenylmethane-2,2',5,5'-tetraisocyanate; 2,4,4'-triisocyanate diphenylmethane; 2,4,6-triisocyanato diphenyl ether; 2,2',4-triisocyanate diphenyl ether; 2,2',4-triisocyanate diphenyl sulfide; 2,4,4'-triisocyanato diphenyl sulfide; 2,3',4-triisocyanato-4'-methyl diphenyl ether; 2,3',4-triisocyanato - 4' - methoxydiphenyl ether; 2,4,4'-triisocyanato - 3' - chlorodiphenyl ether; 4,4',6-diphenyl triisocyanate; 1,2,4-butanetriol triisocyanate; 1,3,3-pentane triisocyanate, 1,2,2-butane triisocyanate, phloroglucinol triisocyanate; the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groups with a group that will split off at the reaction temperature employed with the polymeric ester. Typical compounds which can be used to block the isocyanate groupings, e.g., by forming carbamates therewith, are monohydric phenols, such as phenol, meta-cresol, para-cresol, ortho-cresol and mixtures thereof; the xylenols, e.g., 2,6-dimethyl phenol, 4-ethyl phenol, 4-tertiary butyl phenol, 2-butyl phenol, 4-n-octyl phenol, 4-isooctyl phenol, 2-chlorophenol, 2,6-dichloro phenol, 2-nitro phenol, 4-nitro phenol, 3-nitro phenol; monohydric alcohols such as methyl alcohol, ethyl alcohol, n-propyl alcohol, isopropyl alcohol, tertiary butyl alcohol, tertiary amyl alcohol, octyl alcohol, stearyl alcohol acetoacetic ester; hydroxyalkylcarbamic acid aryl esters, e.g., hydroxyethylcarbamic acid phenyl ester, hydroxyethylcarbamic acid cresyl ester; diethyl malonate; mercaptans, e.g., 2-mercaptobenzothiazole, 2-mercaptothiazoline, dodecyl mercaptan, ethyl 2-mercaptothiazole, β-naphthyl mercaptan, α-naphthyl mercaptan, methyl mercaptan, butyl mercaptan; lactams, e.g., ε-caprolactam, Δ-valerolactam, γ-butyrolactam, β-propiolactam imides; e.g., succinimide, phthalimide, naphthalimide, glutarimide; dimethylphenyl carbinol; secondary amines, e.g., o-ditolylamine, m-ditolylamine, p-ditolylamine, N-phenyl toluidine, phenyl-α-naphthylamine, carbazole, diphenylamine, etc.; mono-α-phenylethyl phenol; di-α-phenylethyl phenol; tri - α - phenylethyl phenol; carvacrol; thymol; methyl diphenyl carbinol; triphenyl carbinol; 1-nitro tertiary butyl carbinol; 1-chlorotertiary butyl carbinol; triphenyl silanol; 2,2'-dinitrophenylamine; 2,2'-dichloro diphenylamine; ethyl n-butyl malonate; ethyl benzyl malonate; acetyl acetone; acetonyl acetone; benzimidazole; 1-phenyl-3-methyl-5-pyrazolone.

Specific examples of such blocked polyisocyanates are (1) a polyisocyanate wherein the isocyanate groups of the reaction product of 3 moles of mixed 2,4- and 2,6-tolylene diisocyanate with trimethylolpropane are blocked by esterification with phenol, and (2) a polyisocyanate wherein the mixed cyclic trimers of 2,4- and 2,6-tolylene diisocyanates have the three free isocyanate groups blocked by esterification with m-cresol. At present the latter is preferred.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or acetoacetic acid ester of phenol or cresylic acid or ε-caprolactam or 2-mercaptobenzothiazole or succinimide or phthalimide or diphenylamine or phenyl-β-naphthylamine, triphenyl methane, triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester, either dry or dissolved in a solvent prior to mixing. The reaction between the polyester and the polyisocyanate is hastened by using elevated temperatures and in preparing wire enamels they are preferably reacted at a temperature of about 650–800° F.

It has further been found that the properties of the polyester wire enamel can be improved by incorporating a tetra-alkyl titanate in place of the metal drier and polyisocyanate. Typical titanates include tetra-alkyl titanates such as tetraisopropyl titanate, tetrapropyl titanate, tetrabutyl titanate, tetraamyl titanate, tetrahexyl titanate, tetraethyl titanate, tetramethyl titanate and diisopropyl dibutyl titanate as well as carbocyclic aryl titanates such as tetraphenyl titanate, tetra cresyl titanate (made from any of the cresol isomers alone or in admixture with each other) and tetraxylenyl titanate. The titanate is used in small amounts, e.g., 0.01%, to 4.0%, based on the total solids in the wire enamel.

In addition to the curing methods commonly employed heretofore, whereby free hydroxyl groups of the polyester are cross-linked by introducing urethane or ether links, the instant polyesters may be cured by a method involving acidolysis. In this latter method, the tris(2-hydroxyalkyl)isocyanurate is first reacted with an equimolar amount of an aromatic or aliphatic monocarboxylic acid, e.g., benzoic, acetic, butyric acids or esters thereof. The product of this reaction is a statistically difunctional alcohol which is then polymerized to afford the instant polyesters. Acidolysis of the polymerized material with dicarboxylic acid will provide crosslinking to result in material useful in making wire enamels. This method of curing is not only effective with the instant diphenol-containing polyesters, but can also be employed with tris(2-hydroxyalkyl)isocyanurate polyesters in general. For example, heating a difunctional tris(2-hydroxyalkyl)isocyanurate (one hydroxyl group blocked by reaction with methyl benzoate) with isophthalic acid at about 140° C., in the presence of crestylic acid and Solvesso 100, affords a turbid brown liquid. A cure film of this material, having good heat stability and useful as a wire enamel, is prepared by coating the turbid liquid on copper and heating at 150° C. for 24 hours.

Additional modifying agents might be used in connection with the instant polyesters. For example; monocarboxylic acids, either saturated or unsaturated; fatty acids and glyceryl esters, also known as drying oils; natural resins, for example rosin, copals and ester gums, etc.; aldehyde resins formed with urea, triazine and melamine, modified if desired with an alcohol; phenol-aldehyde resins, novolak resins, etc. such as aniline-aldehyde resins; terpenes; Diels-Alder addition products; unsaturated alcohols for example allyl alcohol, etc.; vinyl copolymers; epoxide resins such as the reaction product of epichlorohydrin and bisphenol-A; silicone resins; cellulose acetate resins; polyamide resins such as nylon type resins; resins such as styrene-butadene copolymer modified with maleic; and polyamines such as phenylene diamine, methylene dianiline and the like.

To improve the physical characteristics of a modified insulating composition, it is often helpful to employ a triazine curing agent, for example, a melamine-aldehyde resin or a modified melamine-aldehyde resin such as one modified with an alcohol or its equivalent, such as an alkanol, e.g., methanol, ethanol, propanol, butanol, etc. These modified polyesters may contain between about 1% and 20% by weight of a melamine-formaldehyde resin (or alcohol-modified melamine-formaldehyde resin) based on polyester. Preferably, the resin will be present in an amount between about 3% and 10%, with or without curing agents such as metal catalysts.

Other triazines which might be employed for this purpose include benzoguanamine, formoguanamine, acetoguanamine, lauroguanamine, stearoguanamine, propioguanamine, melamine, etc. Preferably, the triazine is a guanamine, most preferably benzoguanamine. The alkylated melamine-aldehyde resins have better flexibility and heat resistance than the corresponding melamine-aldehyde resins. While there can be employed various aldehydes such as formaldehyde, acetaldehyde, propionaldehyde and furfural, the preferred aldehyde is formaldehyde.

As the alkylating agent there can be used methyl alcohol, ethyl alcohol, propyl alcohol, isopropyl alcohol, butyl alcohol, secondary butyl alcohol, amyl alcohol, hexyl alcohol, cyclohexyl alcohol, octyl alcohol, isooctyl alcohol, 2-ethylhexano. The preferred alcohol is butyl alcohol.

The preferred resin is butylated benzoguanamine-formaldehyde. Other suitable triazine resins include methylated benzoguanamine - formaldehyde, ethylated benzoguanamine-formaldehyde, propylated benzoguanamine-formaldehyde, sec-butylated benzoguanamine-formaldehyde, amylated benzoguanamine-formaldehyde, cyclohexylated benzoguanamine - formaldehyde, octylated benzoguanamine-formaldehyde, isooctylated benzoguanamine-formaldehyde, butylated benzoguanamine-acetaldehyde, butylated, benzoguanamine-furfural, amylated formoguanamine-formaldehyde, hexylated acetoguanamine-formaldehyde, butylated, acetoguanamine-formaldehyde, butylated lauroguanamine - formaldehyde, heptylated stearoguanamine-formaldehyde, butylated melamine-formaldehyde, and butylated N,N-dimethyl melamine-formaldehyde.

Use of a phenol-formaldehyde resin as modifying agent in the polyester materials will often afford improved flexibility, heat aging and mandrel after snap properties. As the phenol formaldehyde resin there can be used heat reactive condensation products of formaldehyde with phenols such as phenol per se, o-cresol, m-cresol, p-cresol, mixed cresols, e.g., cresylic acid and meta or para cresol, xylenol, diphenylol propane, p-butylphenol, p-sec. butylphenol, p-tert. amyl phenol, p-octyl phenol, and p,p′-dihydroxy-diphenyl ether. Obviously mixtures of phenols can be used as indicated above.

These phenol-formaldehyde resins are preformed in a conventional manner prior to addition to the polyester.

Modifying the instant polyester with fatty acids and/or oils, for example, of long, medium, or short oil content, provides insulating varnishes especially useful for impregnating armature and field coils or motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

Representative fatty oils which may be used for this purpose are included the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, coconut, tung, oiticia, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc. oils. Instead of using these oils, it should be understood that for the purpose of the present invention fatty acids or mixtures of fatty acids which make up the fatty oils or their equivalents can be employed.

Representative monocarboxylic acids including fatty acids may be illustrated by the following: caproic acid, caprylic acid, castor fatty acid, coconut fatty acid, cottonseed fatty acid, crotonic acid, DCO FA, i.e. primarily $$CH_3(CH_2)_5CH=CH-CH=CH-(CH_2)_7COOH$$

lauric acid, linoleic acid, linolenic acid, linseed FA, oleic acid, pelargonic acid, rosin acid (A.N. 165), soya FA, tall oil FA (A.N. 195, A.N. 192), etc.

It is often preferable that an oil-soluble resin, such as phenol-aldehyde resins be added to these oil-modified polyester compositions. Among the oil-soluble phenol-aldehyde resins which can be used are p-tertiary amylphenol-formaldehyde; p-tertiary butylphenol-formaldehyde; p-tertiary octylphenolformaldehyde; p-phenylphenol-formaldehyde; 2,2-bis(p-hydroxyphenyl) propane-formaldehyde and o-tertiary butylphenolformaldehyde. Substituted phenols alone or in conjunction with phenol can be used in forming the oil-soluble phenolic resin.

The oil-soluble phenol-formaldehyde resins are of the heat-reactive type, and are usually employed in an amount of 10% to 80% by weight of the total of the oil modified polyester and phenolic resin, preferably 20–30%. Increasing the amount of phenolic resin speeds the cure but also scarifices aging characteristics. Hence, the amount of phenolic resin is preferably kept at about 20% by weight. It is also possible to eliminate the phenolic resin from the varnish with resulting loss of the advantages from having the phenolic resin present, and to replace part of the phenolic resin with other heat-reactive resins, e.g., furane resins, triazine resins, urea-formaldehyde, melamine-formaldehyde, and epoxy resins, e.g., bisphenol A-epichlorohydrin resin, although the preferred heat-reactive resins are the phenolic resins since they impart the best combination of improved properties, all things considered. Rosin-modified phenolics are also advantageously employed.

The oil-modified polyester resins can be further modified by employing various resins in conjunction therewith. Included among such resins are phenol-sulfur resins; phenol-acetylene resins, including resins produced from phenol and substituted phenols, including difunctional, trifunctional, and tetrafunctional phenols, naphthols, bisphenols, salicyclic acid and salicylates, etc.; modified phenolic resins, including phenol-terpene resins, phenol-terpene aldehyde resins, phenol-naphthalene-aldehyde resins, phenol-urea-formaldehyde resins, phenol-aniline-formaldehyde resins, phenol-glycerol resins, etc.; non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

In addition to the resin components, the insulating varnish also includes one or more solvents, such as xylene, mineral spirits, isophorone, naphtha, toluene, etc.

Insulating wire enamels containing polyesters derived from tris(2-hydroxyalkyl)isocyanurates, either unmodified or modified in any of the variety of ways discussed hereinbefore, are applied to various elelectric conductors and other components according to standard procedures well known to those skilled in the art.

Coated conductors with improved characteristics such as flexibility, heat resistance and abrasion resistance, are obtained by modifying the coating and the manner in which it is applied in accordance with generally familiar considerations, for example by providing multiple coating of varying composition. In this manner, it is often desirable to provide the electrical conductor with a first continuous coating of the instant polyester compositions either modified or unmodified, and a second continuous coating of polyethylene terephthalate.

In other circumstances, it may be desirable to provide the electrical conductor with a continuous inner dielectric coating of a non-linear thermosetting resin and a thin, uniform, continuous outer dielectric coating of a non-linear branched polyester composition of the instant invention. This configuration will often permit reduction on the number of coatings required to eliminate heat shock and thermal shock without detracting from the desirable qualities of the insulation.

These and other coating configurations known in the art may be used with the instant polyesters to afford superior insulation of electrical conductors.

Use of an unsaturated polycarboxylic acid in preparing the polyesters affords compositions suitable for laminates, casting resins, etc. For this purpose an appropriate cross-linking monomer is added to the composition, e.g., styrene, α-methylstyrene, methyl methacrylate, diallyl phthalate, triallylisocyanurate, triallylcyanurate, ethylene glycol dimethacrylates and homologs thereof, diethylene glycol divinyl ether, alkyl vinyl ethers, alkyl acrylates, etc.

The choice of cross-linking monomer will depend in part upon the desired characteristics and properties of both the polyester and final product to be fabricated therefrom. For example, if it is desirable to use a high level of isocyanurate or unsaturated acid, etc. in preparing the polyester, in order to impart certain physical or chemical properties to the product, the most advantageous monomer might vary from styrene to styrene-methyl methacrylate mixture to diallyl phthalate. The selection of cross-linking agent will be influenced in these instances by considerations such as solubility, shelf life of the compound, and properties desired in the cured product. In particular, the use of diallyl phthalate in place of styrene or styrene-methyl methacrylate mixture improves elevated temperature strength retention of the product.

The amount of cross-linking monomer employed will vary according to the end use of the product, but generally, monomer concentrations between about 20% and 70% by weight will give products useful for casting and laminates. Preferably, the monomer concentration will be between 30% and 60%.

In addition to the cross-linking monomer, unsaturated polyesters will also contain a suitable vinyl polymerization initiator or catalyst for the cross-linking, and possibly a promoter. Among the initiators which might be used are peroxides, such as benzoyl peroxide, di-t-butyl peroxide, dicumene peroxide, and methylethyl ketone peroxide; hydroperoxides such as t-butylhydroperoxide; azo componunds such as azo-bis-isobutyronitrile and azo-bis-valeronitrile; etc. Catalytic amounts of initiator, e.g., 0.2–2%, are used. Useful promoters include naphthenates and alkanoates of cobalt, lead, manganese, and calcium.

It has been found that copolymerizing the instant polyesters of tris(2-hydroxyalkyl)isocyanurate with a polycarboxylated imide affords an ester-imide resin with superior electrical insulating qualities.

The imide ring-containing compound can be formed by reacting (a) an aromatic carboxylic anhydride which, in addition to a 5-membered anhydride ring, contains at least one further reactive site, e.g., carboxyl group, carboxylic anhydride group or a hydroxyl group, and (b) a primary amine containing at least one further reactive group, e.g., carboxyl or hydroxyl or an additional primary amino group. The anhydride group of the aromatic carboxylic compound might be replaced with two adjacent carboxyl groups, or the esters, semiesters or semiacides thereof. The primary amine might be replaced with its salt, amide, lactam or polyamide so long as the bound primary amino group is capable of forming an imide.

Among the aromatic carboxylic compounds which might be used are pyromellitic anhydride, trimellitic anhydride, naphthalene tetracarboxylic dianhydrides and dianhydrides of tetracarboxylic acids containing two benzene nuclei wherein the carboxyl groups are in the 3,3'- and 4,4'-positions.

Examples of primary amino compounds which might be used are the aliphatic diprimary diamines, e.g. ethylene diamine, tetramethylene diamine, hexamethylene diamine, nonamethylene diamine, and aromatic diprimary diamines, e.g., benzidine, diaminodiphenyl methane, diaminodiphenyl ketone, sulfone, sulfoxide, ethers and thioethers, phenylene diamine, tolylene diamine, xylylene diamine, as well as diamines containing three benzene nuclei, e.g., bis(4-aminophenyl-α,α'-p-xylene or bis-(4-aminophenoxy)-1,4-benzene, and also cycloaliphatic diamines, e.g., 4.4'-dicyclohexylmethane diamine. Amino alcohols might be used, e.g., monoethanolamine, monopropanolamines or dimethylethanol amine, as well as aminocarboxylic acids, e.g., glycine, aminopropionic acids, aminocaproic acids, or amino-benzoic acids.

The ester-imide resins thus afforded provide superior lacquers for coating electrical wires, which stand up well to thermal shock.

The following examples are provided to more fully illustrate the instant invention. They are provided for illustrative purposes only and are not to be construed in any way as limiting the scope of the invention, which is defined by the appended claims.

EXAMPLE I—POLYESTER

A 500-ml. resin kettle was equipped with a 3-in. stainless steel turbine agitator, thermometer, adjustable length nitrogen inlet tube, and steam-jacketed Allihn rectification condenser with a Friedrichs condenser set for downward distillation. Into the apparatus was charged tris(2-hydroxyethyl)isocyanate (165.4 g., 0.634 mole), dimethyl terephthalate (153.4 g., 0.791 mole), bisphenol A (53.8 g., 0.236 mole), litharge (0.056 g., 0.015 wt. percent on reactant charge wt.), 16.7 ml. xylol, and 33.3 ml. of high-boiling aromatic naphtha solvent (Solvesso 100). The mixture was heated with agitation at 350 r.p.m. from 88° to 235° C. over 6¼ hours under a nitrogen sparge of 0.5 s.c.f.h. The brittle solid had an AN of 1.6 and HN of 153.6.

EXAMPLE II—MAGNET WIRE ENAMEL

Polyester from Example I (20.0 g.) was dissolved with agitation and heating in a round-bottom flask in 15.8 g. cresylic acid. To this solution, 2.0 g. of trimer of 2,4-tolylene diisocyanate, having residual isocyanate groups blocked with phenol or cresols, 15.9 g. cresylic acid, 16.2 g. Solvesso 100, and 0.8 g. tetraisopropyl titanate were added to form the enamel.

To determine solids content and weight loss at 240° C., aproximately 1.0 g. of the enamel was accurately weighed into each of two aluminum dishes (1¾ in. diameter). The dishes were set in a draft-free vented oven at 150° C. for 24 hours to cure the enamel. After this time the dishes were reweighed to determine percent solids. The dishes were then set in a 240° C. draft-free oven for 1 week and again reweighed to determine percent weight loss after aging at 240° C. Two copper-coated 3 x 6 x 1/32 in. steel paint test plaques were coated with the enamel using a No. 40 spiral wiper rod. The curing procedure described in the preceding paragraph was repeated on both panels. One coated panel was sent for face-up and face-down Gardner impact. The other coated panel was aged 1 week at 240° C., and then sent for Gardner face-up and face-down impact testing Gardner impact testing was carried out by allowing a 2-lb. dart to fall from an increasing height until the film either lost adhesion or disintegrated on impact. The value recorded was the maximum impact energy that did not affect the film.

Polyester properties

| | |
|---|---|
| Acid number | 1.6 |
| Hydroxyl number | 153.6 |
| Gardner-Holt bubble viscosity for 60% solids in methyl Cellosolve | R¼ |
| Enamel viscosity, Gardner-Holt | B |
| Enamel solids, 24-hour cure at 150° C. | 25.5 |
| Wt. loss, 1 week aging at 240° C. (percent) | 8.1 |
| Gardner impact, 1 week aging at 240° C., face up | 20 |

EXAMPLE III—INSULATING VARNISHES (A) Oil-modified alkyd

Coconut oil (427 g., 1.86 moles) and glycerol (138 g., 1.5 mole) are charged into a resin kettle, which is then heated, stirred and sparged with nitrogen (0.5 cubic feet per hour). When the temperature reaches 180° C., 2 g. of 0.5% calcium naphthenate is added. The temperature is then increased to 240° C. and the alcoholysis continued until the monoglyceride has compatibility with methanol greater than 3:1.

The reaction temperature is reduced to 180° C. and phthalic anhydride (547 g., 3.7 moles), maleic anhydride (20 g., 0.204 mole), bisphenol A (22.8 g.,. 0.1 mole) and glycerol (175 g., 1.9 mole) are added to the kettle. Ten minutes after the temperature reached 180° C., tris (2-hydroxyethyl)isocyanate (78.3 g., 0.3 mole) is added and the temperature is then raised to 230–240° C. The esterification is continued until the acid number (solid basis) reaches the range of 6–12, and the viscosity at 60% solids in xylene ranges from $Z_2$–$Z_4$.

The temperature is then lowered to 180° C. and the resin reduced to 60% solids in xylene.

(B) Varnishes

A blend consisting of 70% of the alkyd of Part A and 30% of a butylated melamine-formaldehyde resin (Plaskon 3385) is prepared and formed into a film of 1.5–2.0 mil thickness by curing for 30 minutes at 95° C.

A blend consisting of 84% of the alkyd of Part A and 16% of the phenolic-formaldehyde resin as prepared in Example 10 of U.S. Pat. 3,312,645 is prepared and cured in a similar manner to afford an insulating varnish.

EXAMPLE IV.—ESTER-IMIDE COPOLYMERS (A) Imid-containing reactant

Commercial cresol (1100 g.) is placed in a reaction vessel equipped with a stirrer and thermometer, and the temperature is raised to 150° C. Trimellitic anhydride (230 g.) is added in portions until it is completely dissolved, and then 119 g. of 4,4'-diaminodiphenylmethane is introduced. Heating is continued for 8 hours at 140–150° C., and then the reaction mixture is cooled. The resulting precipitate is recovered by filtration to afford the desired imide ring-containing product, which is washed with alcohol and ether, then dried.

(B) Ester-imide copolymer

To 1300 g. of a polyester prepared according to the procedure of Example I is added, at 175° C., 140 g. of the imide ring-containing product of Part A. The temperature is then raised to 185° C. and when the imide is nearly taken up by the polyester, an additional 140 g. of imide product is slowly added while raising the temperature to 218° C. Then 3 g. of cadmium acetate is added and the reaction is continued for an additional 3 hours at 215–220° C., and finally under vacuum. The resulting ester-imide resin is then dissolved in 870 g. of commercial cresol and a solution of 16 g. of butyl titanate in 30 g. of cresol is added. The resulting lacquer is diluted with a mixture of solvent naphtha and cresol until resin solids content is 30%.

EXAMPLE V.—UNSATURATED POLYESTER

Polyester is prepared according to the procedure of Example I, wherein said dimethyl terephthalate is replaced by an equimolar mixture of maleic anhydride and phthalic anhydride. Also added to the reaction is hydroquinone (0.02% by weight based on charge weight).

The temperature is then raised to 210° C., the mixture stirred at 350 r.p.m., and a nitrogen sparge rate of 1.5–2.0 standard cubic feet per hour maintained. When the acid number falls to below 50, the overhead is set for total take-off of volatiles, and 0.75 g. of hydroquinone (0.15 wt. percent on charge) added. After 5½ hours at 210° C., the product is cooled to 160° C. and dumped into tared aluminum trays.

EXAMPLE VI.—HIGH-IMPACT TYPE ALKYD MOLDING COMPOUND

The following formulation is used to prepare a high-impact type alkyd molding compound:

| Material: | Weight, g. |
|---|---|
| Polyester of Example V | 578 |
| Diallyl phthalate (DAP) Monomer | 67 |
| 50% Benzoyl peroxide in tricresyl phosphate | 28 |
| Phenolic oil stabilizer | 0.8 |
| Aluminum silicate pigment filler | 585 |
| $BaCO_3$ | 98 |
| Stearic acid | 19 |
| 622½" glass | 618 |
| Mapico black pigment | 20 |
| Total | 2013.8 |

The polyester is dissolved, with agitation, in methylene chloride in a 1-gallon can. Catalyst, stabilizer, monomer, and pigment are then added. After addition of the filler and barium carbonate, a solution of stearic acid in methylene chloride is added, and the slurry is rapidly stirred for about 15 minutes to obtain a uniform dispersion. The slurry is then poured onto the glass in a Hobard mixer, and the mixture is stirred to uniformly coat the glass with the slurry. The compound is spread out on large boards to dry overnight to remove the solvent. A charge of 460 g. is used to mold a 10" x 10" x ⅛" panel under a pressure of 75 tons on a 10¼-inch ram for 5 minutes at 300° F.

EXAMPLE VII

The procedure of Example I is repeated wherein said bisphenol A is replaced by an equivalent amount of the following diphenols:

4,4'-dihydroxydiphenylmethane
hydroquinone
4,4'-dihydroxybiphenyl
1,4-dihydroxynaphthalene
4,4'-dihydroxydiphenyl sulfone

What is claimed is:

1. A composition comprising a polyester which is the reaction product of a tris(2-hydroxyalkyl)isocyanurate wherein each 2-hydroxyalkyl group contains from 2 to 4 carbon atoms; a polycarboxylic acid selected from the group consisting of dicarboxylic acid, tricarboxylic acid and anhydrides thereof; from 10 to 30% by weight, based on the total weight of the reactants of a diphenol; an ethylenically unsaturated polycarboxylic acid; a crosslinking monomer, and a crosslinking initiator selected from the group consisting of a peroxide compound and an azo compound, said initiator being present in catalytic amount.

2. The composition of claim 1 wherein the isocyanurate of said polyester is tris(2 - hydroxyethyl)isocyanurate.

3. The composition of claim 2 wherein the polycarboxylic acid of said polyester is terephthalic acid.

4. The composition of claim 2 wherein said crosslinking monomer is styrene.

5. The composition of claim 2 wherein said crosslinking monomer is α-methylstyrene.

6. The composition of claim 2 wherein said crosslinking monomer is methyl methacrylate.

7. The composition of claim 2 wherein said crosslinking monomer is diallyl phthalate.

8. The composition of claim 2 wherein said crosslinking monomer is triallyl isocyanurate.

9. A composition comprising a polyester-polyimide which is the reaction product of the polyester of claim 1 and a polyimide wherein the polyimide is the reaction product of reactants comprising (1) a primary amine containing at least one further reactive group selected from the group consisting of carboxyl, hydroxyl and primary amine, and (2) an aromatic carboxylic anhydride containing at least one further reactive group selected from the group consisting of carboxyl, carboxylic anhydride and hydroxyl.

10. The composition of claim 9 wherein the isocyanurate of said polyester is tris(2-hydroxyethyl)isocyanurate.

11. The composition of claim 10 wherein the polycarboxylic acid of said polyester is terephthalic acid.

References Cited

UNITED STATES PATENTS

| | | | |
|---|---|---|---|
| 3,632,837 | 1/1972 | Kolyer et al. | 260—857 |
| 3,160,602 | 12/1964 | Kantor et al. | 260—47 |
| 3,342,780 | 9/1967 | Meyer et al. | 260—75 |
| 3,351,624 | 11/1967 | Conix | 260—47 |
| 3,390,131 | 6/1968 | Roeser | 260—75 |
| 3,426,098 | 2/1969 | Meyer et al. | 260—841 |

LESTER L. LEE, Primary Examiner

U.S. Cl. X.R.

117—126 AB, 128.4, 155 R, 218, 232; 161—231; 260—16, 22 R, 22 CQ, 22 TN, 26, 33.4 P, 33.6 R, 33.6 UB, 47 CZ, 75 NH, 75 NM, 28 HS, 824 R, 835, 842, 843, 850, 860